United States Patent [19]

Mabee

[11] Patent Number: 5,021,764

[45] Date of Patent: Jun. 4, 1991

[54] DIAGNOSTICS FOR ELECTRONIC TRANSMISSION CONTROL SYSTEM

[75] Inventor: Brian Mabee, Sterling Heights, Mich.

[73] Assignee: Automotive Products (USA) Inc., Auburn Hills, Mich.

[21] Appl. No.: 464,037

[22] Filed: Jan. 12, 1990

Related U.S. Application Data

[63] Continuation-in-part of Ser. No. 323,825, Mar. 15, 1989.

[51] Int. Cl.⁵ .............................................. G08B 21/00
[52] U.S. Cl. .................................. 340/439; 180/337; 340/456
[58] Field of Search ................. 340/439, 456; 180/337

[56] References Cited

U.S. PATENT DOCUMENTS

| | | | |
|---|---|---|---|
| 2,634,622 | 4/1953 | Cripe | 74/335 |
| 3,937,105 | 2/1976 | Arai et al. | 74/846 |
| 4,262,783 | 4/1981 | Scarrott et al. | 192/0.04 |
| 4,271,728 | 6/1981 | Wakamatsu | 74/866 |
| 4,275,618 | 6/1981 | Bale | 74/878 |
| 4,324,322 | 4/1982 | Sibeud | 192/0.032 |
| 4,495,457 | 1/1985 | Stahl | 364/424.1 |
| 4,583,171 | 4/1986 | Hara et al. | 364/424 |
| 4,638,690 | 1/1987 | Hattori et al. | 74/866 |
| 4,664,217 | 5/1987 | Welch | 180/247 |
| 4,790,204 | 12/1988 | Tury et al. | 74/483 |
| 4,800,360 | 1/1989 | Dunkley et al. | 340/456 |
| 4,817,471 | 4/1989 | Tury et al. | 74/866 |
| 4,821,607 | 4/1989 | Kawai | 74/866 |
| 4,823,643 | 4/1989 | Koshizawa | 74/866 |
| 4,825,993 | 5/1989 | Kurihara et al. | 192/0.092 |
| 4,841,815 | 6/1989 | Takahashi | 74/866 |
| 4,848,529 | 7/1989 | Kurihara et al. | 192/0.076 |

FOREIGN PATENT DOCUMENTS

| | | |
|---|---|---|
| 0310387 | 4/1989 | European Pat. Off. |
| 0316301 | 5/1989 | European Pat. Off. |
| 0316302 | 5/1989 | European Pat. Off. |
| 0316303 | 5/1989 | European Pat. Off. |
| 60-40850 | 3/1985 | Japan . |
| 8903319 | 4/1989 | PCT Int'l Appl. |

OTHER PUBLICATIONS

SAE Paper 840448.
SAE Paper 850289
SAE Paper 850782.
SAE Paper 861170.
SAE Paper 830880.

Primary Examiner—Glen R. Swann, III
Attorney, Agent, or Firm—Krass & Young

[57] ABSTRACT

The present invention is an electronic control apparatus for control of an automatic transmission in a motor vehicle which controlling a motor to shift the transmission to said desired transmission state when the desired transmission state differs from the present transmission state signal. The electronic control apparatus detects and stores any faults in controlling the motor, and generates an output indicating any stored fault codes in response to a particular operator input. In the preferred embodiment the operator input is via plural push-buttons with corresponding lamps. In normal operation a single lamp is turned ON to indicate the present gear. Fault codes are indicated by turning ON the lamps in a code corresponding to the fault code. Detected faults include invalid transmission state signal, time out without completing the shift and over current in the motor. The preferred embodiment further includes an input-/output port for receiving commands to read the stored fault codes, to read vehicle condition inputs to the electronic controller and to cause the electronic controller to control the motor to shift the transmission to a commanded state.

23 Claims, 6 Drawing Sheets

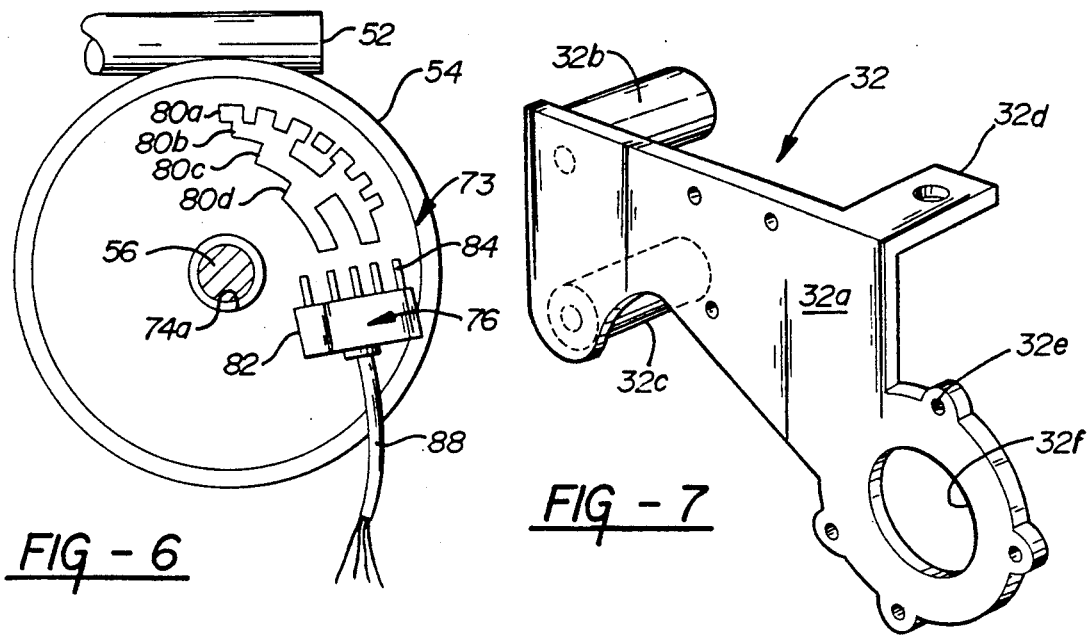
FIG-6
FIG-7
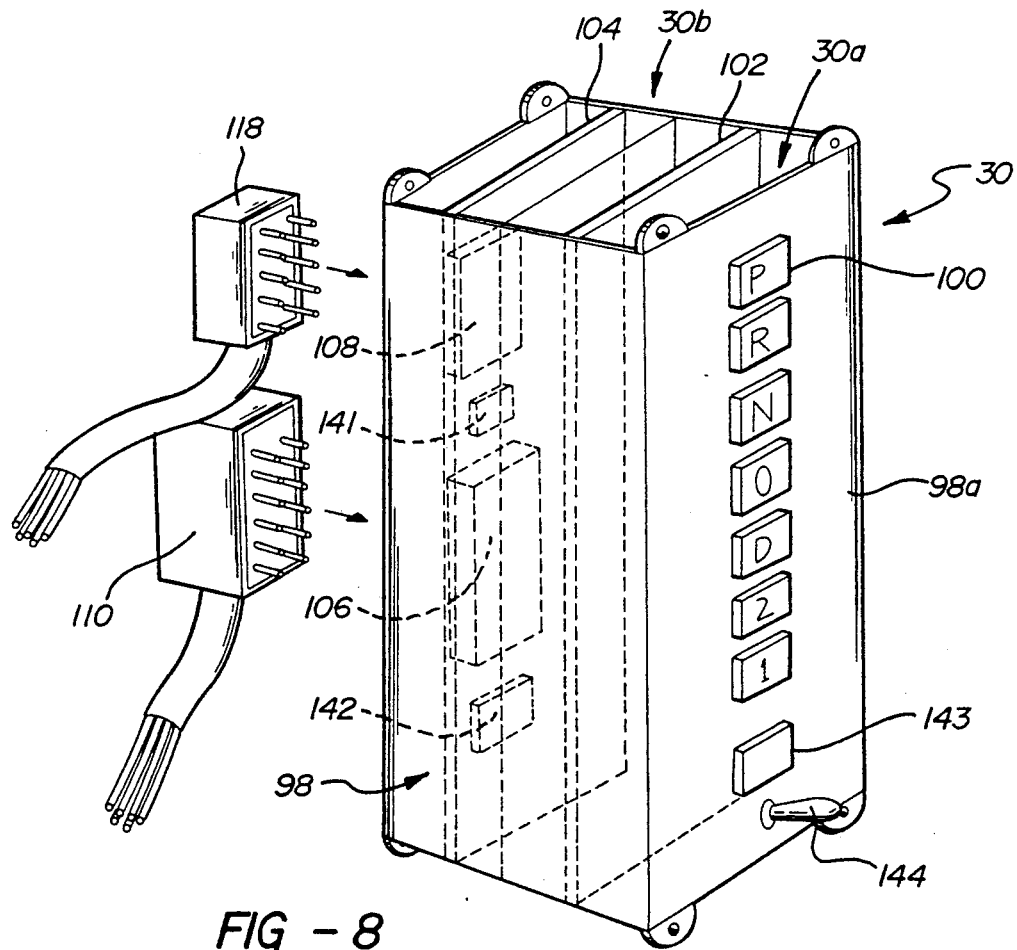
FIG-8

DIAGNOSTICS FOR ELECTRONIC TRANSMISSION CONTROL SYSTEM

RELATED APPLICATION

This application is a continuation-in-part of U.S. Pat. application Ser. No. 323835 filed on Mar. 15, 1989.

BACKGROUND OF THE INVENTION

This invention relates to an electric shift apparatus especially suited for use with a motor vehicle having an automatic transmission.

Motor vehicles since their inception have required some manner of gear change mechanism to satisfy the varying torque and speed requirements encountered during the typical duty cycle of a motor vehicle. For many years these gear change mechanisms were manual in the sense that they required an operator input from a shift lever or the like to effect each desired gear change ratio. More recently, so called "automatic transmissions" have become popular in which much of the shifting is done without operator input in response to sensed speed and throttle opening parameters. These automatic transmissions typically include a mode select lever positioned on the transmission housing and movable between a plurality of selectively pivoted positions corresponding to a respective plurality of shift modes within the transmission. The mode select lever is pivotally moved between its several shift positions by a cable or linkage mechanism extending from the mode select lever to a suitable gear selector lever located in the passenger compartment of the vehicle. Various proposals have been made in the past to eliminate the mechanical interconnection between the driver operated lever and the mode select lever and provide instead an electrical signal generated by a suitable action on the part of the driver and transmitted electrically to some manner of power means arranged to move the mode select lever. None of these attempts to provide an electric shift mechanism for an automatic transmission of a motor vehicle have met with any degree of commercial success since they provided a slow or imprecise shifting action and/or have generated excessive warranty and maintenance costs.

Recently a new type of automatic transmission control has emerged. These new automatic transmission controls employ electronic control circuits to compare the desired transmission state based upon a operator input with the present transmission state from a transmission state sensor. The electronic control circuit compares the desired transmission state with the sensed current transmission state and controls a motor to shift the transmission when these differ. This system is exemplified in U.S. Pat. No. 4,709,204 entitled "Electric Shift Apparatus" issued Dec. 13, 1988, and U.S. Pat. No. 4,817,471 entitled "Electronic Control System for Control of a Manual Transmission Apparatus" issued Apr. 4, 1989, each of which is assigned to the assignee of the present application.

One problem with such a system is in diagnosis of transmission faults. Servicing the transmission is complicated by the additional layer of controls in the electronic control circuitry. It is difficult and time consuming to determine if the fault lies in the sensors, the electronic control circuit, the motor, or in the transmission itself. Thus there is a need in the art to improve the diagnostic and serviceability of such transmission controls.

SUMMARY OF THE INVENTION

This invention is directed to the provision of an electronic control apparatus for the automatic transmission of a motor vehicle which provides positive and precise shifting, which is amenable to ready installation in the motor vehicle at the time of the original motor vehicle manufacture, which is reliable in operation even over a long motor vehicle life, and which provides means for readily diagnosing transmission faults.

The invention electronic control apparatus is intended for use with a motor vehicle having an automatic transmission of the type including a mode select member driven by an electric motor positioned outside of the transmission housing.

The electronic control apparatus receives input signals corresponding to the desired transmission state and the present state of the transmission, and includes a logic control unit for determining if the desired transmission state differs from the present transmission state, and for generating a clockwise motor drive signal if the desired transmission state is clockwise of the present transmission state and a counter-clockwise motor drive signal if the desired transmission state is counter-clockwise of the present state, in the case in which the desired transmission state differs from the present transmission state, and includes a motor drive circuit connected to the motor driving the mode select lever for rotating this motor clockwise in response to the clockwise motor control signal and rotating this motor counter-clockwise in response to the counter-clockwise motor control signal.

According to the invention this electronic transmission control system further includes means for detecting transmission faults as well as means for storing an indication of these faults. The stored indication of faults is kept in memory within the electronic control circuit until called for. Then it is either indicated via a user feedback device or output electronically.

According to the invention this electronic transmission control system includes an input/output port for transmitting commands to the system. These commands include a command to read the vehicle state signals coupled to the system, whereupon the electronic transmission control system transmits data via the input/output port. These commands also include output commands causing the electronic transmission control system to control the motor to shaft to a corresponding transmission state.

BRIEF DESCRIPTION OF THE DRAWINGS

FIG. 6 is a cross-sectional view taken on line 6—6 of FIG. 4;

FIG. 7 is a perspective view of a bracket employed in the power module of the invention;

FIG. 8 is a fragmentary perspective view of a control module employed in the electric shift apparatus of the invention;

DETAILED DESCRIPTION OF THE PREFERRED EMBODIMENT

Figure 1:
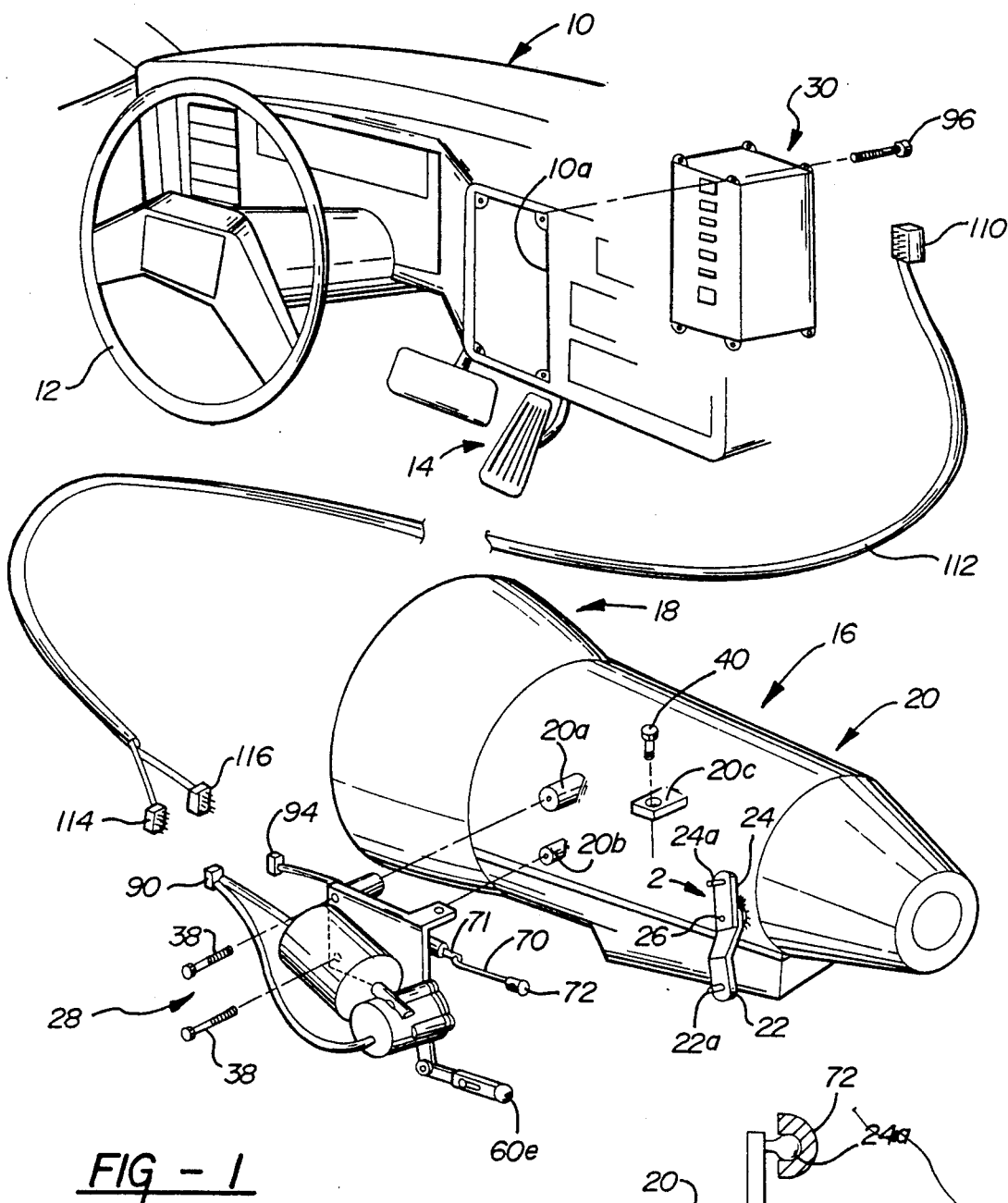
FIG. 1 is a fragmentary perspective view of a motor vehicle embodying the invention electric shift apparatus.
Figure 2:
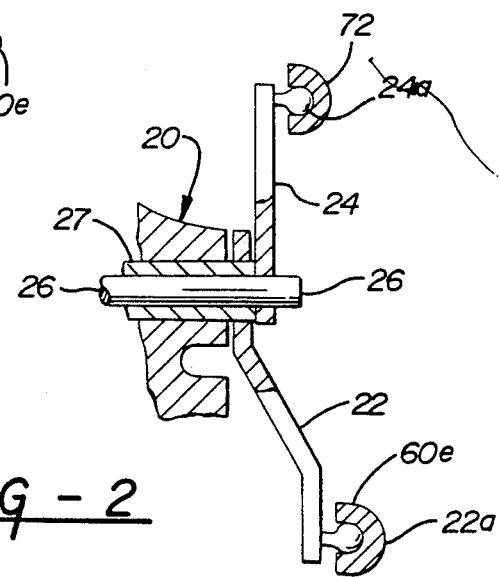
FIG. 2 is a fragmentary view looking in the direction of the arrow 2 in FIG. 1.
Figure 3:
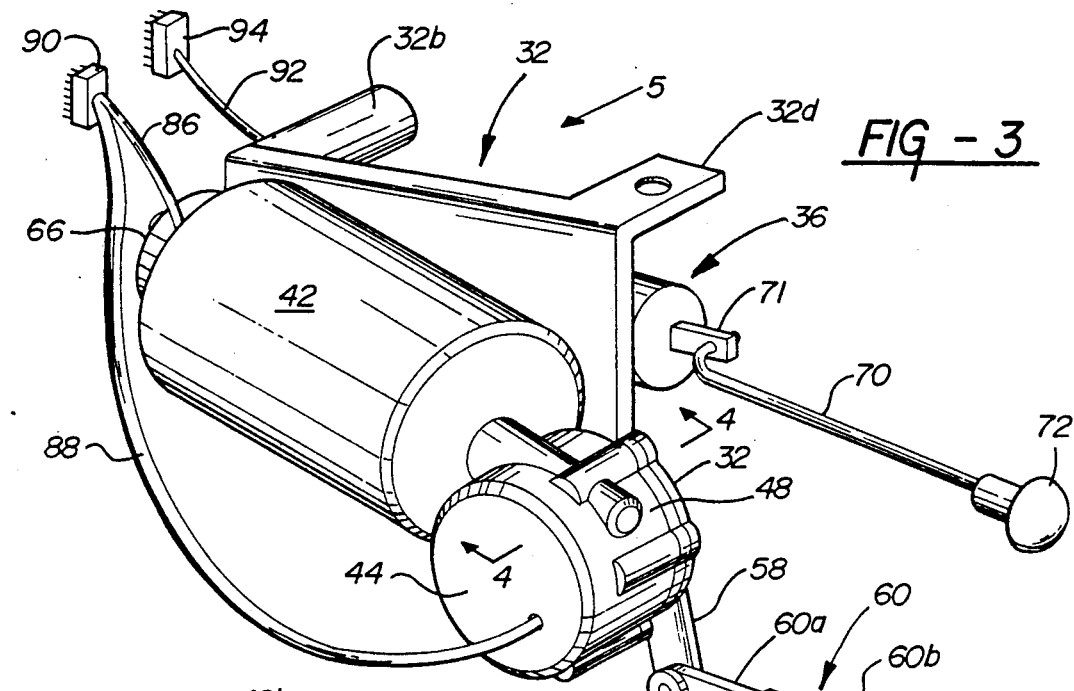
FIG. 3 is a perspective view of a power module employed in the invention electric shift apparatus.
Figure 4:
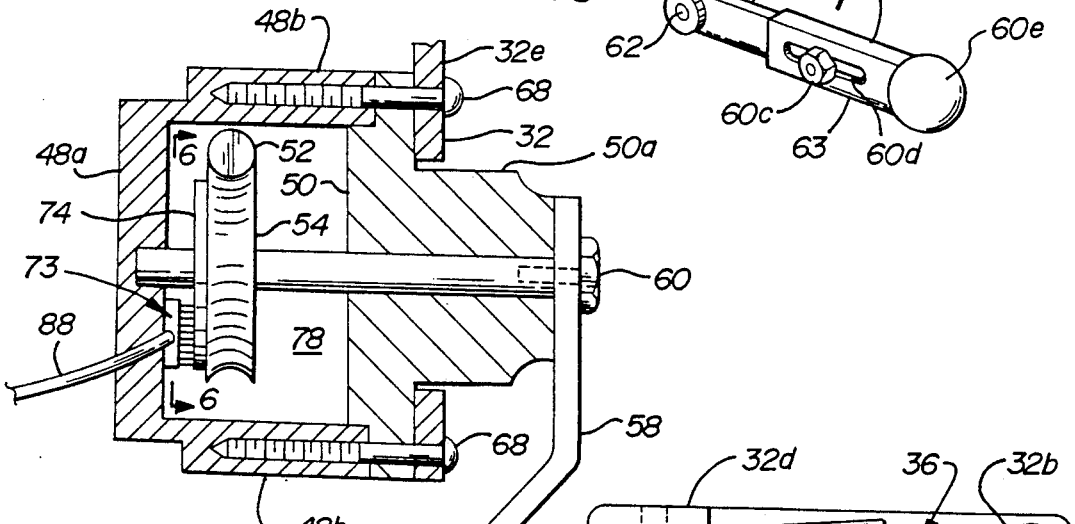
FIG. 4 is a fragmentary cross-sectional view taken on line 4—4 of FIG. 3.
Figure 5:
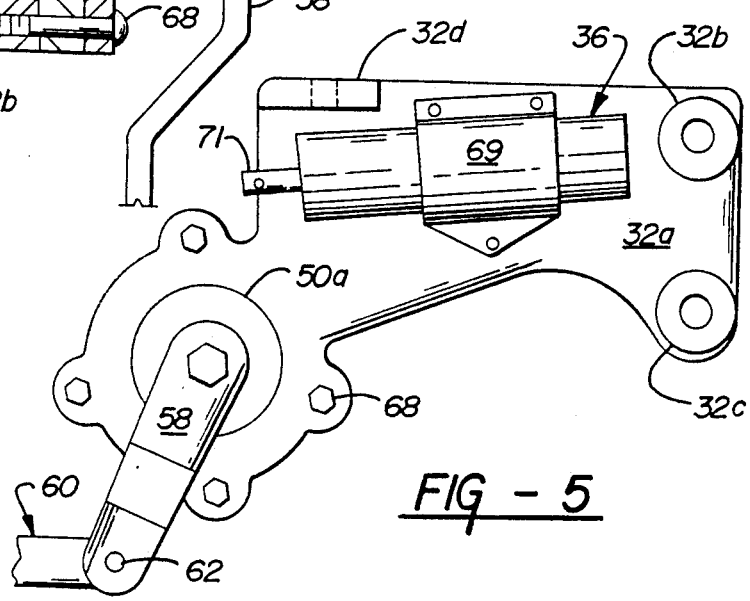
FIG. 5 is a fragmentary view taken in the direction of the arrow 5 in FIG. 3.

The shift apparatus including the electronic control system of the present invention is seen schematically in FIG. 1 in association with a motor vehicle of the type including an instrument panel assembly 10 positioned with the passenger compartment of the motor vehicle; a steering wheel 12 associated with the instrument panel; an accelerator pedal assembly 14; and an automatic transmission assembly 16 including a torque converter 18 and a transmission 20. Transmission 20 includes a mode select lever 22 and a kick-down lever 24 each mounted externally of the transmission housing for pivotal movement at one end thereof about a common axis. Specifically, kick-down lever 24 is fixedly mounted at its lower end on a shaft 26 and mode select lever 22 is fixedly mounted at its upper end on a tubular shaft 27 (see FIG. 2) mounted concentrically on shaft 26. It will be understood that selected pivotal movement of mode select lever 22 rotates tubular shaft 27 to operate internal devices within the transmission to position the transmission in a plurality of transmission modes such as PARK, NEUTRAL, DRIVE, etc., and that pivotal movement of kick-down lever 24 rotates shaft 26 to operate internal devices within the transmission to the next lower gear for passing purposes or the like.

Power module 28 is adapted to be bolted to the transmission in proximity to levers 22 and 24 and includes a bracket 32, a motor assembly 34, and a solenoid 36.

Bracket 32 may be formed as a die casting and includes a planar main body portion 32a, lug portions 32b and 32c and a flange portion 32d. Bracket 32 is readily bolted to the housing of transmission 20 by bolts 38 passing through lugs 32b and 32c for threaded engagement with threaded bosses 20a and 20b on the transmission housing, and by a bolt 40 passing downwardly through an aperture in a flange 32 on the transmission housing for threaded engagement with a lug 20c on the transmission. Bosses 20a and 20b and lug 20c are already present on a typical automatic transmission housing and therefore need not be especially provided to carry out the invention.

Motor assembly 34 includes a DC electric motor 42, a speed reduction unit 44, and a lever assembly 46. Motor 42 is direct current motor and may, for example, have an output torque rating of 200 inch-pounds.

Speed reduction unit 44 is suitably secured to motor 42 and includes a housing 48, a cover plate 50 having a central hub member 50a, a worm gear 52 co-axial with the output drive of the motor 42, a worm wheel 54 driven by worm gear 52, and an output shaft 56 driven by worm wheel 54 and journalled in cover plate 50 and in an end wall 48a of housing 48.

Lever assembly 46 includes a first lever 58 secured by a nut 60 to the free end of speed reduction unit output shaft 56, and a second lever 60 secured by pivot means 62 to the free end of lever 58. Lever 60 is a compound member and includes sections 60a and 60b. Section 60b telescopically receives section 60a and with a pin 60c carried by section 60a guiding in a slot 60d in section 60b to allow the two sections to move axially relative to each other to vary the effective length of lever 60. The two sections may be locked in any selected position of adjustment by a nut 63 carried by pin 60c. The free end of lever 60 comprises a plastic snap fitting 60e for snapping engagement with a ball fitting 22a on the free end of mode select lever 22.

The motor assembly 34 is mounted on the outboard face of the planar main body portion 32a of bracket 32. Specifically, motor 42 is mounted to the outboard face of bracket portion 32a by a bracket 66 and speed reduction unit 44 is mounted to the outboard face of bracket portion 32a by a plurality of circumferentially spaced bolts 68 passing through apertures 32e in bracket 32 and through suitable apertures in speed reduction unit cover plate 50 for engagement with threaded bosses 48b spaced circumferentially about housing 48. In assembled relation, the hub portion 50a of cover plate 50 passes through aperture 32f in bracket 32 to position lever 58 on the inboard face of the bracket.

Solenoid 36 may comprise for example a pull type unit capable of generating three pounds of pull and having a stroke of between three-eighths and one-half inch. Solenoid 36 is secured to the inboard face of planar main body portion 32a of bracket 32 by a clamp 69. A cable 70 is secured to the plunger 71 of the solenoid and a plastic snap fitting 72 is secured to the free end of cable 70.

Power module 28 further includes an encoder assembly 73 operative to sense the shift position of the transmission and generate an encoded signal representative of the sensed shift position.

Encoder assembly 73 includes an encoder wheel 74 and a pick-up device 76. Encoder wheel 74 may be formed for example of a suitable plastic material with conductive coating and is positioned on a side face of worm wheel 54 within the closed and sealed interior chamber 78 defined by housing 48 and cover plate 50. Encoder wheel 74 includes a central aperture 74a passing speed reduction unit output shaft 56 and further includes code indicia 80 provided on the exposed outer face of the wheel and arranged along four arcuate tracks 80a, 80b, 80c and 80d centered on the center line of the encoder wheel.

Pick-up device 76 includes a body member 82 mounting a plurality of flexible resilient contact fingers 84 for respective coaction with indicia tracks 80a, 80b, 80c and 80d. In addition to the four fingers 84 for respective engagement with the four indicia tracks, a fifth finger is provided to provide a ground for the system.

A lead 86 from motor 42 and a lead 88 from pick-up device 76 are combined into a pin-type plug 90 and a lead 92 from solenoid 36 terminates in a pin-type plug 94.

Control module 30 is intended for ready installation in an opening 10a in instrument panel 10 or a center console disposed between the two front seats by insertion of the module from the rear of the housing and fastening of the module within opening 10a by the use of several fasteners such as seen at 96. Module 30 includes a housing structure 98 of general box-like configuration enclosing an operator access or push-button submodule 30a and a logic submodule 30b.

Push-button submodule 30a includes a plurality of push-buttons 100 positioned in vertically spaced relation in the front face 98a of the module housing and corresponding to the available transmission shift modes. Specifically, buttons 100 include buttons corresponding to PARK, REVERSE, NEUTRAL, OVERDRIVE, DRIVE, LOW1 and LOW2 shift positions for the transmission. Buttons 100 coact in known manner with a printed circuit board 102 to generate suitable electrical signals in response to respective depression of the buttons 100.

Logic submodule 30b includes an electronic printed circuit board 104 suitably electrically connected to printed circuit 102 and suitably mounting a first plurality of connector terminals 106 and a second plurality of connector terminals 108. Electronic printed circuit board 104 also includes logic chip 141 and high power buffer chip 142. These integrated circuit chips are coupled together and coupled to connector terminals 106 and connector terminals 108 in a known manner.

Connector terminals 106 coact with a pin-type plug 110 at the end of a cable 112. Cable 112 includes plugs 114 and 116 at its remote end for plugging receipt of plugs 90 and 94 so that plug 110 embodies the information from leads 86, 88 and 92. Leads 86 includes clockwise motor drive lead 86a for driving motor 42 in a clockwise direction and counter clockwise motor drive lead 86b for driving motor 42 in a counter clockwise direction. Lead 92 is coupled to drive solenoid 92.

Connector terminals 108 coact with a pin-type plug 118. Plug 118 embodies the information from leads 120, 121, 122, 123, 125, 126, 128 and 129. Lead 120 is associated with a switch sensing the open or closed position of the driver's door of the vehicle. Lead 121 is associated with a switch sensing the presence or absence of a driver on the driver's seat of the vehicle. Lead 122 senses the open or closed condition of the ignition switch of the vehicle. Lead 123 is connected to a current sensor of a known type for sensing the current through motor 42. Lead 125 is connected to a speed sensor which provides information with respect to the instantaneous speed which the vehicle is traveling. Lead 126 is connected with a switch which is closed in response to movement of the throttle to its extreme open throttle position in known manner. Lead 128 is connected with brake switch 133 which senses whether or not the brake is actuated. Lead 129 is connected with seat belt switch 135 which senses whether or not the driver's seat belt is fastened.

Figure 9:
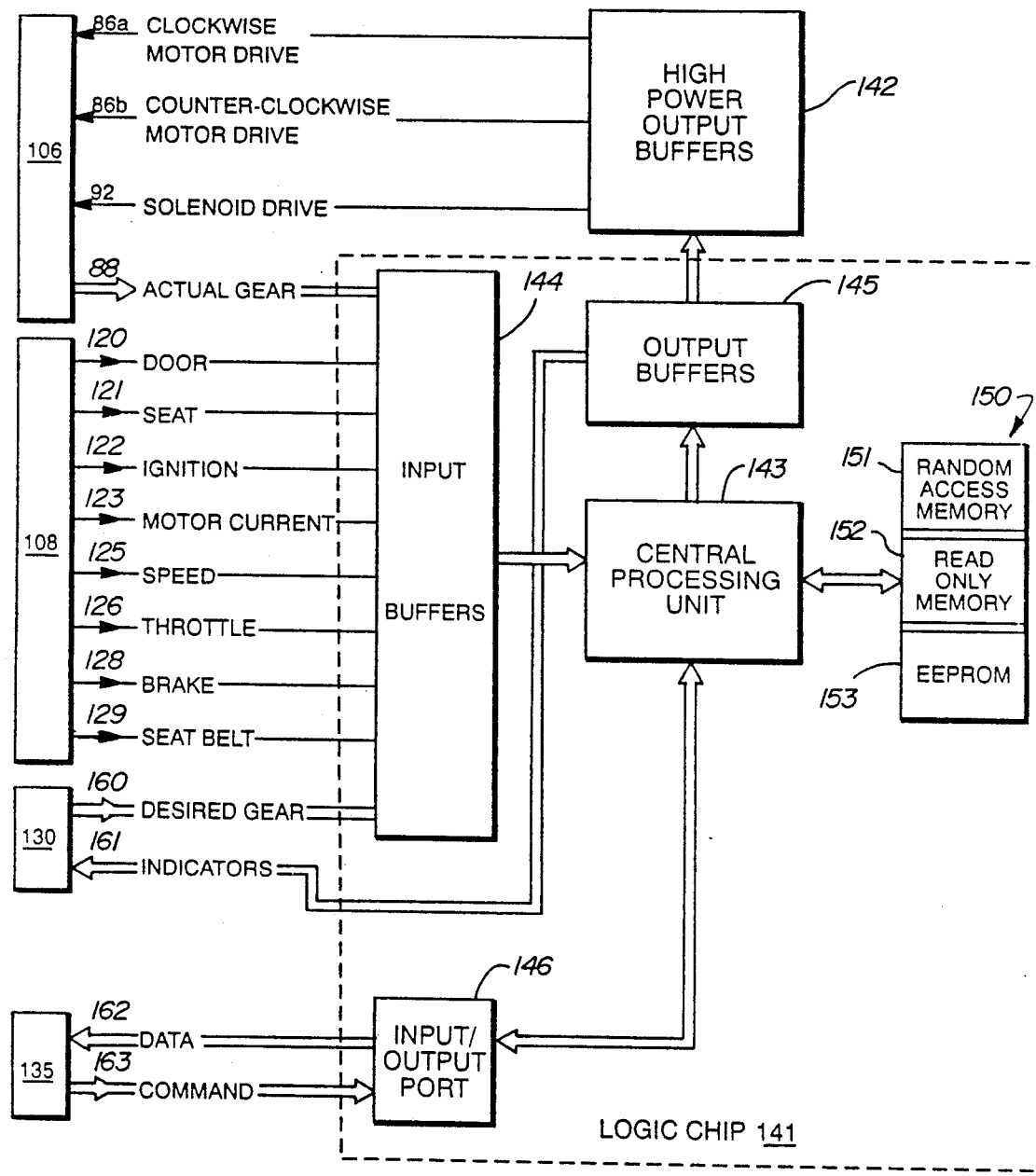
FIG. 9 is a circuit diagram for the electronic controller of the invention electric shift apparatus.

Several connections between submodules 30a and 30b are not illustrated in FIG. 8 but are depicted in FIG. 9. The selection of the desired gear, made by depression of the appropriate push-button 100 is coupled to logic chip 141 via lines 160. In the preferred embodiment illustrated in FIG. 8, there are 7 push-buttons 100 representing the transmission states of PARK, REVERSE, NEUTRAL, OVERDRIVE, DRIVE, LOW1 and LOW2, respectively. Logic chip 141 further generates signals on lines 161 to indicate which of the lamps associated with the push-buttons 100 to illuminate. In the case of normal operation a single one of the push-buttons 100 is illuminated corresponding to the actual transmission state as detected by encoder assembly 73. It is understood that proper connections are made via connector 130 between these submodules to carry these signals.

Logic chip 141 is further coupled to an input/output connector 135. Logic chip 141 provides an output on data lines 162 in a manner which will be further described below. Logic chip 141 also receives command inputs on command lines 163. The operation of logic chip 141 in conjunction with the commands on command lines 163 will be further described below.

The electronic transmission control is delivered to the vehicle manufacturer in the form of power module 28 and control module 30. During the assembly of the vehicle, the power module 28 is mounted on the transmission housing proximate the control levers 24 and 26 and the control module 30 is mounted in the instrument panel 10, whereafter plugs 90 and 94 are plugged into plugs 114 and 116 and plugs 110 and 118 are plugged into control module 30 to complete the assembly of the invention electric shift apparatus. Note that submodules 30a and 30b are delivered to the vehicle manufacturer already coupled via connector 130. Connector 135 is located on control module 30 in a position which is accessible for servicing the electronic transmission control.

The mounting of power module 28 on the transmission housing is accomplished simply by passing bolts 38 through bossed 32b and 32c for threaded engagement with transmission housing bosses 20a and 20b, passing bolt 40 through lug 32d for threaded engagement with transmission housing lug 20c, and snapping snap fittings 60e and 72 respectively over ball fitting 22a on the free end of mode select lever 22 and a ball fitting 24a on the free end of kick-down lever 24. As the lever assembly 46 is connected to the mode select lever, lever sections 60a and 60b of lever 60 move telescopically and selectively relative to each other to provide the precise effective length of length 60 to allow positive snapping engagement of snap fitting 60e over ball 22a irrespective of manufacturing tolerances, whereafter nut 64 is tightened to lock the lever 60 in its precise adjusted position.

Installation of control module 30 in instrument panel 10 is affected simply by moving the control module from the rear of the panel into the opening 10a and fastening the module in place by the use of fasteners 96 or the like. Following the plugging of plugs 90 and 94 into plugs 114 and 116 and the plugging of plugs 110 and 118 into connector terminals 106 and 108, the system is operational and ready for use.

FIG. 9 illustrates a simplified schematic block diagram of the combination of logic chip 141 and high power buffer chip 142. Logic chip 141 is preferably embodied by a microprocessor chip. FIG. 9 illustrates logic chip 141 including: central processing unit 143; input buffers 144; output buffers 145; input/output port 146; and memory 150, consisting of random access memory 151, read only memory 152 and electrically erasable programmable read only memory 153.

Input buffers 144 receives the various input signals and converts them into signals recognizable by central processing unit 143. Output buffers 145 supplies signals on line 161 to control the indicators of the push-buttons 100 in submodule 30a. In addition, output buffers 145 drives high power output buffers circuit 142 which supplies the required high power signals for the clockwise motor drive, the counter-clockwise motor drive and the solenoid drive. Central processing unit 143 is bidirectionally coupled to input/output port 146 for both transmitting information to and receiving information from input/output port 146. Input/output port 146 is preferably a serial communications port constructed in a manner known in the art. The use of input/output port 146 will be further described below in conjunction with a description of the operation of logic circuit 141.

Central processing 143 is bidirectionally coupled to memory unit 150. Central processing 143 is capable of both reading from the writing to portions of random access memory 151. Random access memory 151 is preferably formed of the so called dynamic random access memory which is operational only when the logic chip 141 is powered. Central processing unit 143 uses random access memory 151 as a depository for temporary variables, intermediate results of computations and status variables in a manner known in the art. Read only memory 152 preferably includes permanently stored therein the control program for control of logic chip 141. In a manner known in the art, logic chip 141 is constructed having a particular program permanently stored within read only memory 152. This program interacts with central processing unit 143 in a manner known in the art to control the operation of logic chip 141. The flow charts illustrated in FIGS. 10, 11, 12 and 13 constitute a description of the program permanently stored within read only memory 152. Electrically erasable programmable read only memory 153 is preferably employed for permanently storing various fault codes corresponding to faults in transmission operation noted by central processing unit 143. Electrically erasable programmable read only memory 153 can be written into and erased by specially supplied electrical signals from central processing unit 143. Electrically erasable programmable read only memory 153 can be read by central processing unit 143 in the same manner as a reading read only memory 152. It is considered advantageous to employ electrically programmable read only memory 153 for the purpose of storing the fault codes, because such memory is nonvolatile, that is the contents of the memory are not reset on loss of the electrical power to logic chip 141.

The operation of electronic control of the automatic transmission will now be described in conjunction with flow charts illustrated in FIGS. 10, 11, 12 and 13. In accordance with the preferred embodiment of the present invention a program embodying these operations is permanently stored within read only memory 152 of logic chip 141. Central processing unit 143 sequentially recalls one instruction of this program at a time and performs the corresponding operation. The flow charts illustrated in FIGS. 10, 11, 12 and 13 are not intended to include the exact detailed steps necessary for control of central processing unit 143. Rather, these flow charts present an outline of the process of logic chip 141. Those skilled in the art of microprocessor programming will be able to provide the exact instructions for storage within read only memory 152 once the particular logic chip 141 is selected, together with its corresponding instruction set. Those skilled in the art will also understand that it is technically feasible to perform the operations outlined in FIGS. 10, 11, 12 and 13 employing a special purpose hardware logic circuit or a properly configured programmable logic array. The description of the operation of the electrical controller in the present application appearing in FIGS. 10, 11, 12 and 13 would equally well indicate the particular logic processes necessary for embodiment of logic chip 141 in these forms.

Figure 10:
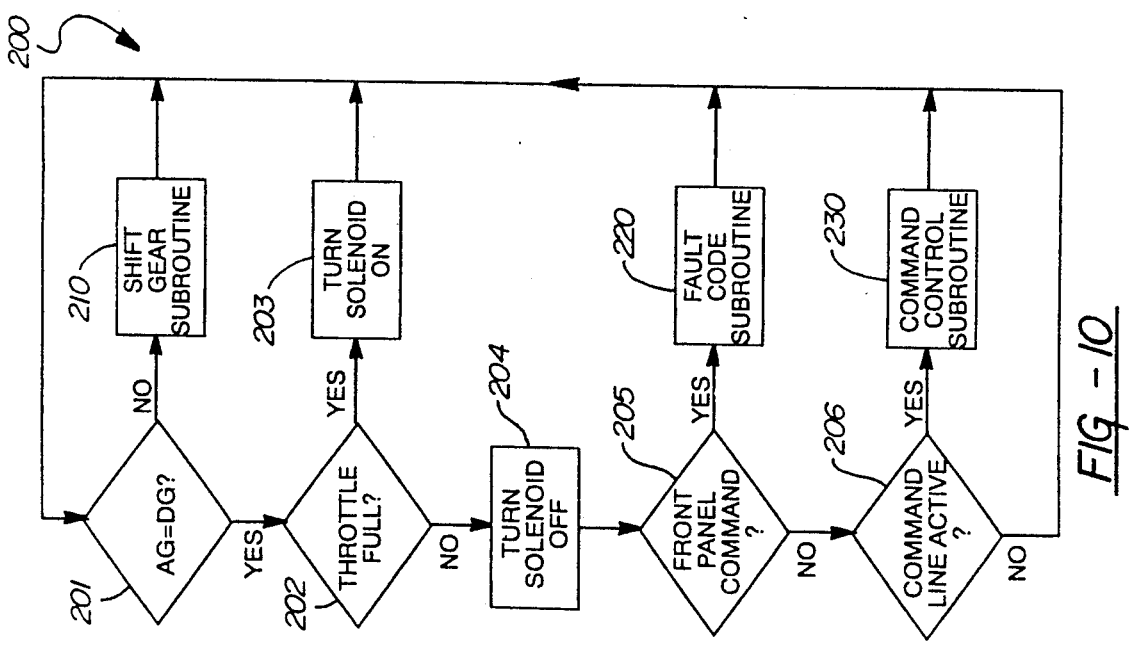

FIG. 10 illustrates in flow chart form a program 200 for control of central processing unit 143 of logic chip 141. Program 200 is a continuous loop of repeated tests which cause the electronic controller of the present invention to operate. Program 200 begins with decision block 201 which test to determine whether the actual gear indicated by the actual gear signal on line 88 corresponds to the desired gear indicated by the push-button 100 which has been selected. A signal indicating this desired gear is transmitted to logic chip 141 via line 160. If the actual gear does not correspond to the desired gear, then program 200 executes shift gear subroutine 210. Shift gear subroutine 210 controls motor 42 for shifting the state of the transmission to the desired gear.

Figure 11:
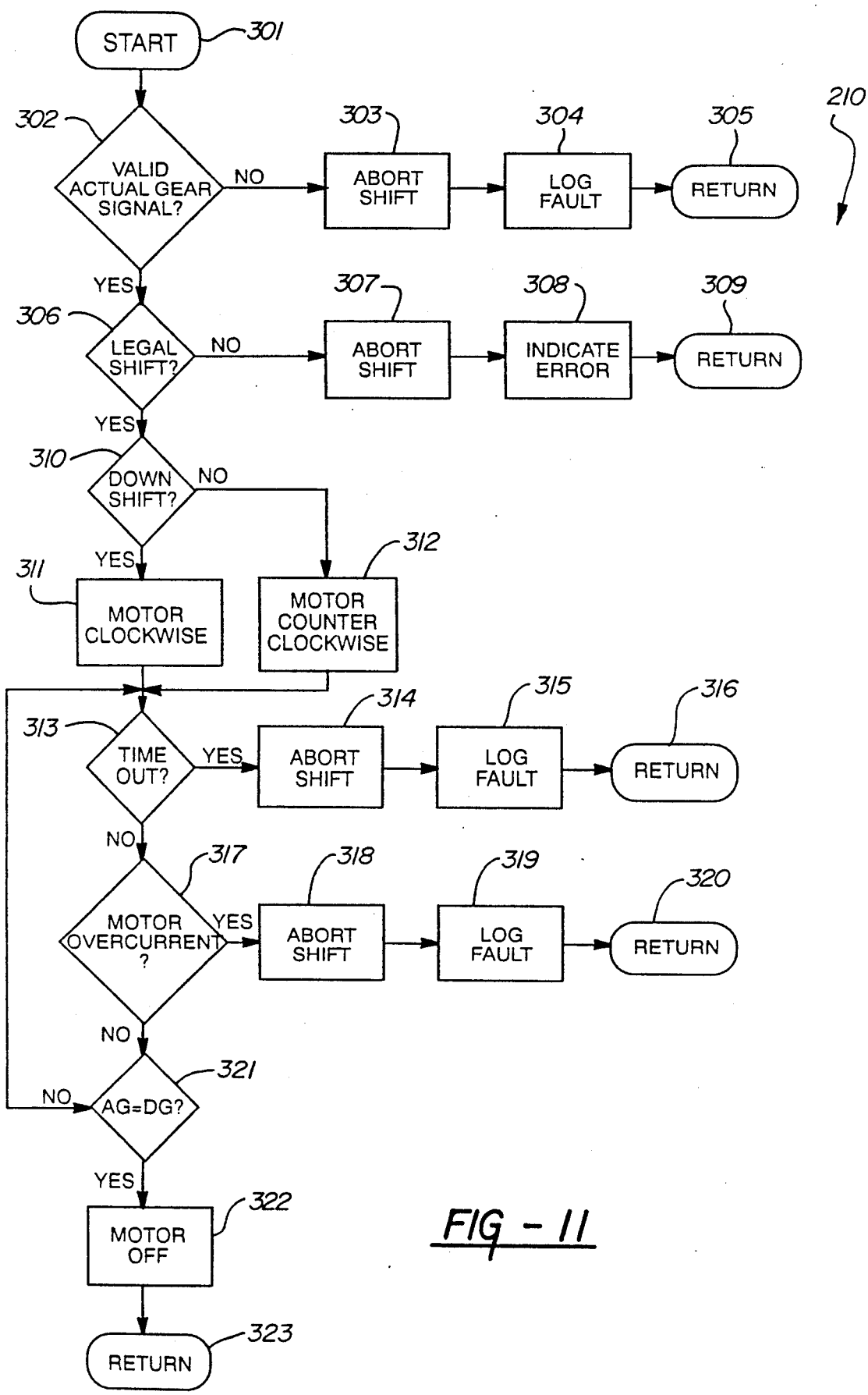
FIGS. 10, 11, 12 and 13 are flow charts illustrating the operation of the electronic controller of the invention electric shift apparatus.
Figure 12:
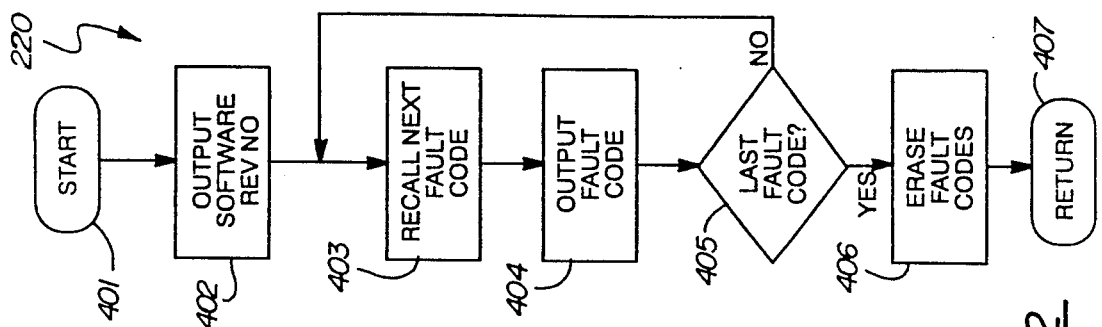

Shift gear subroutine 210 is illustrated in FIG. 11. Shift gear subroutine 210 is begun via a start block 301. Shift gear subroutine 210 first tests to determine whether the actual gear signal received on line 88 corresponds to a valid actual gear. This test checks to determine whether or not encoder assembly 73 is properly operating. If the actual gear signal from encoder assembly 73 is improper then shift gear subroutine 210 aborts the shift (processing block 303). Shift gear subroutine 210 next logs an indication of the fault (processing block 304). In accordance with the preferred embodiment of the present invention this logging of the fault takes place by central processing unit 143 causing electrically erasable programmable read only memory 153 to store a fault code corresponding to the current fault, that is that the actual gear signal is invalid. Once this is complete, then shift gear subroutine 210 returns to main program 200 via return block 305.

In the event that a valid actual gear signal has been received then shift gear subroutine 210 tests to determine whether or not the transition from the present gear to the desired gear is a legal shift (processing block 306). In accordance with the prior mentioned U.S. Pat. Nos. 4,709,204 and 4,817,417, there are various shift combinations which are improper and not allowed. For example, the current vehicle speed could be so large as to create an engine overspeed condition if the transmission were shifted to the desired gear. As a further example, the electronic controller for the transmission may require that the vehicle be at a sufficiently slow speed to shift into REVERSE gear, or that the foot of the driver be on the brake in order to shift out of PARK. These and other conditions are designed to protect the engine and transmission from a possibly damaging condition due to an operator mistake in requesting a particular desired gear. The exact nature of these conditions is not essential to the practice of the present invention and will not be further detailed. If the transition from the present gear to the desired gear is an illegal shift then this shift is aborted (processing block 407) and an error condition is indicated to the driver (processing block 308). There is a distinction between an error and a fault. In this application the term "error" refers to the operator requesting a shift which is not permitted to be made because of the protections built into the electronic controller. The term "fault" is reserved for those conditions detected by the electronic controller which indicate that there is some faulty operation of the electronic controller itself. Once the illegal shift has been aborted and indicated, shift gear subroutine 210 is exited by a return block 309.

Shift gear subroutine 210 next test to determine whether the transition from the present gear is a downshift (decision block 310). In accordance with the preferred embodiment of the present invention the gears are arranged in descending order from PARK, REVERSE, NEUTRAL, OVERDRIVE, DRIVE, LOW2 and LOW1. Shifts in the direction of this progression are downshifts, shifts in the opposite direction are upshifts. If the desired shift is a downshift then logic chip 141 generates a signal on clockwise motor drive line 86a by way of high power output buffers 142 (processing block 311). This serves to control motor 42 to move in the downshift direction. On the other hand, if the desired shift is an upshift, logic chip 141 generates a signal on counter-clockwise motor drive line 86b via high power output buffers 142 (processing block 312). In either event, the particular motor drive signal is continued until the shift is aborted or completed.

Shift gear subroutine 210 next tests to determine whether or not a predetermined period of time has elapsed since the beginning of the shift (decision block 313). In accordance with the preferred embodiment of the present invention, the electronic controller expects that the shift between any present gear to any desired gear must occur in less than this predetermined period of time. If this predetermined period of time is exceeded, then there is some fault in the system. Accordingly, this shift is aborted (processing block 314) and a time out fault is logged (processing block 315). This fault is logged by central processing unit 143 causing a particular fault code to be stored within electrically erasable programmable read only memory 153 corresponding to this fault. In particular, it may be useful to also include within this code an indication of the desired gear, in order to aid in determination of the fault. Once this is accomplished then shift gear subroutine 210 is exited by a return block 316.

Shift gear subroutine 210 next tests to determine whether or not the current through motor 42 has exceeded a predetermined limit (decision block 317). In accordance with the preferred embodiment of the present invention, the electronic controller for the transmission includes some means of sending a signal corresponding to the current through motor 42 to logic chip 141. Logic chip 141 determines whether the not the current flowing through motor 42 exceeds a predetermined amount. This predetermined amount is set so that the shift is aborted prior to any damage to the motor in the event that some portion of the drive components or the transmission is jammed. If such an overcurrent condition is detected then shift gear subroutine 210 aborts the shift (processing block 318) and logs this fault (processing block 319). In the case of the logging an overcurrent fault, it is considered advantageous to include in the fault code some indication of the actual transmission state upon detection of the this overcurrent condition. This can be accomplished by having some portion of the fault code for this fault indicating the encoded output received from encoder assembly 73. Once this fault has been logged then shift gear subroutine 210 is exited via a return block 320.

Shift gear subroutine 210 next tests to determine whether or not the actual transmission state as evidenced by the actual gear signal received on lines 88 corresponds to the desired gear of the desired gear signal received on line 160. If this is not the case then the process returns to decision block 313 to repeat the series of tests. As mentioned above, the motor control signal either clockwise or counter-clockwise continues to be generated until the actual gear reaches the desired gear or until either a timeout or motor overcurrent condition causes the shift to be aborted. If the actual gear equals the desired gear then the motor drive signal is turned off (processing block 322). This completes the desired shift therefore shift gear subroutine 210 is exited by a return block 23.

Referring back to FIG. 10, if the actual gear equals the desired gear then program 200 tests to determine whether or not the throttle is fully opened (processing block 202). If the throttle is fully opened, as evidenced by actuation of a switch detected via line 126, then logic chip 141 generates an output signal on solenoid drive line 92 via high power input buffers 142 to turn on solenoid 36. This serves to actuate the kick-down lever to shift the transmission into the next lower gear. Once solenoid 36 is turned on program 200 returns to decision block 201 to repeat the series of tests. On the other hand, if the throttle is not fully opened solenoid 36 is turned off (processing block 204). In this case logic chip 141 generates a signal on solenoid drive line 92 via high power output buffers 142 that turns off solenoid 36.

In the event that the throttle is not fully opened, program 200 next tests to determine whether or not a front panel command has been received (decision block 205). In accordance with the present invention, the depression of a predetermined set of push-buttons 100 permits the reading out of the fault codes stored within electrically erasable programmable read only memory 153. One such predetermined code combination is the simultaneous depression of PARK, REVERSE, NEUTRAL and OVERDRIVE. Such a combination of depressions of push-buttons 100 would not occur during normal operation of the transmission, but only to initiate the reading out of the fault codes.

If such a front panel command is detected then program 200 enters fault code subroutine 220. Fault code subroutine 220 is illustrated in greater detail in FIG. 12. Fault code subroutine 220 is entered via start block 401. Fault code subroutine 220 first outputs a code corresponding to the software revision number (processing block 402). This output preferably occurs in two fashions. Firstly, central processing unit 143 generates an appropriate code on the data output line 162 via input/output port 146. In addition, central processing unit 143 provides an output on output buffers 145 to drive the indicators in the front panel of control module 30 to have a predetermined pattern. In the preferred embodiment, individual lamps corresponding to the push-buttons for PARK, REVERSE, NEUTRAL, OVERDRIVE, DRIVE, LOW1 and LOW2 are illuminated to indicate a digital "1" and not illuminated to indicate a digital "0." This pattern of illuminated and non-illuminated indicators thus forms a digital number corresponding to the software revision number of the program stored within read only memory 152. Output of this software revision number is advantageous to enable determination of particularities in function of particular revisions of the program 200.

Fault code subroutine 220 then recalls the next fault code stored within electrically erasable programmable read only memory 153 (processing block 403). In the case of the first pass through processing block 403, this fault code is the first fault code stored within electrically erasable programmable read only memory 153, on the second pass through processing block 403 this fault code is the second fault code stored within electrically erasable programmable read only memory 153, etc. Fault code subroutine 220 then outputs this recalled fault code (processing block 404). In the preferred embodiment this fault code is output in two manners. Firstly, the fault code is placed upon data line 162 via input/output port 146. Secondly, the fault code is indicated by selective illumination and nonillumination of push-buttons 100 via output buffers 145 on indicator line 161. Logic chip 141 preferably provides this visual signal for a predetermined interval of time sufficiently long to enable service personnel to read the fault code before proceeding to the next step in fault code subroutine 220.

Fault code subroutine 220 next tests to determine whether or not the last entered fault code has been recalled from electrically erasable programmable read only memory 153 (decision block 405). In the event that the last entered fault code has not been recalled then fault code subroutine 220 returns to processing block 403 to recall and then output the next fault code. This process continues until all fault codes stored within electrically erasable programmable read only memory 153 have been recalled in output. Once the last fault code has been recalled in output, then fault code subroutine 220 erases the fault codes stored within electrically erasable programmable read only memory 153 (processing block 406). This serves to clear electrically erasable programmable read only memory 153 for the storage of a new set of fault codes. By this means, it can be assured that the fault codes read in this manner correspond only to faults detected since the last time the fault codes were read. Once the fault codes have been cleared then fault code subroutine 220 is exited via return block 407. Referring back to FIG. 10, exit of fault code subroutine 220 returns control to decision block 201 to repeat the set of tests of main program 200.

In the event that the front panel command has not been received, program 200 tests to determine whether or not a signal on the command line 163 has been received (decision block 206). If a command on command line 163 has been received then program 200 executes command control subroutine 230.

Figure 13:
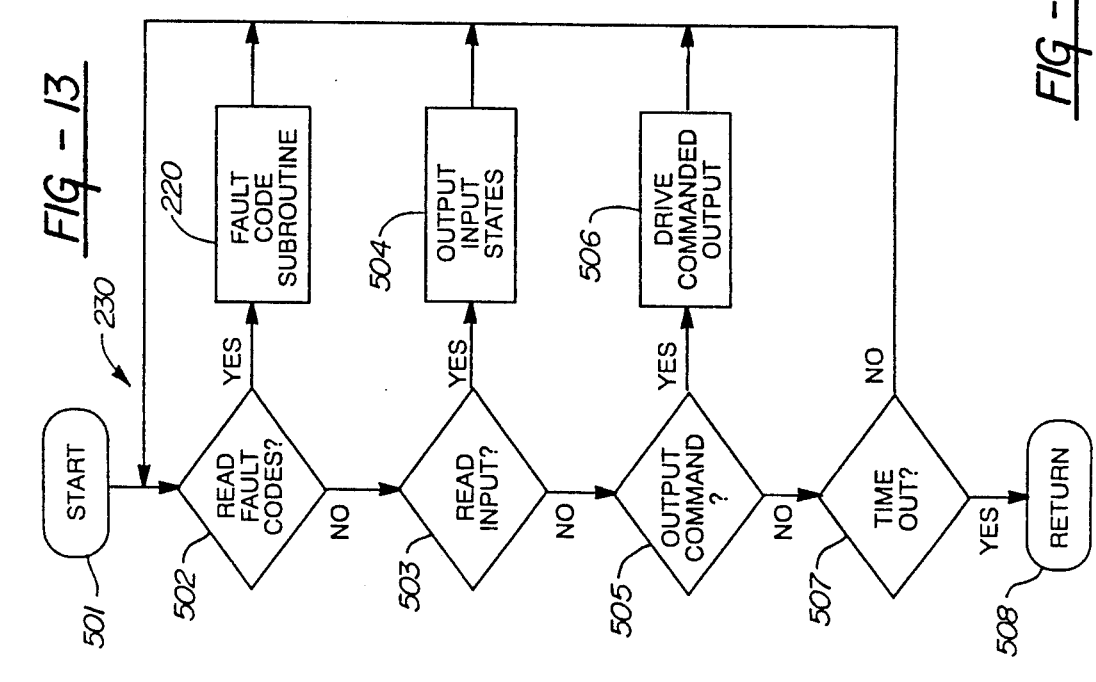

Command control subroutine 230 is illustrated in FIG. 13. Command control subroutine 230 is entered via start block 501. Command control subroutine 230 first tests to determine whether or not a read fault codes command has been received (decision block 502). In accordance with the preferred embodiment of the present invention various commands to logic chip 141 can be received via command lines 163 and input/output port 146. One such command is a command to read the fault codes stored within electrically erasable programmable read only memory 153. If a read error code command has been received then fault code subroutine 220 is executed. Fault code subroutine 220 has been previously described in conjunction with FIG. 12. Once fault code subroutine 220 is complete control returns to decision block 502 to repeat a set of tests in the command control subroutine.

If a read fault code command has not been received, then command control subroutine 230 tests to determine whether a read input command has been received (decision block 503). In accordance with the preferred embodiment of the present invention, logic chip 141 is capable of generating on data line 162 data corresponding to the particular signals received on actual gear line 88, door line 120, seat line 121, ignition line 122, motor current line 123, speed line 125, throttle line 126, brake line 128, seat belt line 129 or desired gear line 160. It is contemplated that the read input command would designate which one or more of these codes are to be read. Upon detection of a read input command, command control subroutine 230 outputs on data line 162 digital data corresponding to the particular input state or states indicated by the read input command (processing block 504). Once this is complete, command control subroutine 230 returns to decision block 502 to repeat the set of tests.

In the event that a read input command has not been received then command control subroutine 230 tests to determine whether or not a output command has been received (decision 505). In accordance with the preferred embodiment of the present invention, logic chip 141 is capable in response to an output command on line 163 to drive clockwise motor drive on line 86a, counterclockwise motor drive on line 86b, solenoid drive line 92 or indicators drive lines 161 to a particular commanded state. In the event that such an output command has been received then command control subroutine 230 causes logic chip 141 to produce the commanded output on the corresponding output line (processing block 506). This technique is useful to determine whether or not a particular fault is in the electronic controller or in the controlled parts. By causing logic chip 141 to generate particular outputs, these two functions can be separated. Once the output has been driven to the command state then command control subroutine 230 returns to decision 502 to repeat the set of tests.

In the event that an output command has not been received then command control subroutine 230 tests to determine whether or not logic chip 141 has been in the command control subroutine 230 for longer than a predetermined period of time without entry of a command. In the event that this time has not been exceeded then command control subroutine 230 returns to decision block 502 to repeat the set of tests. Command control subroutine 230 is exited via return block 508 in the event that more than the predetermined period of decision block 507 has elapsed since the last command received on command lines 163.

In accordance with the preferred embodiment of the present invention each of the lamps of indicator lamps 218 is associated with one of the push-button switches 100. In particular, it is desirable that push-buttons 100 comprise lighted push-button switches with the indicator lamps enclosed therein. The individual indicator lamps are preferably connected to the illumination supply in a manner that enables the intensity of these lamps to be adjusted in accordance with the adjustment of the intensity of the interior instruments.

Whereas preferred embodiments of the invention have been illustrated and described in detail it will be apparent that various changes have been made in the disclosed embodiments not departing from the scope or spirit of the invention.

I claim:

1. An electronic control apparatus for control of an automatic transmission apparatus in a motor vehicle having a plurality of transmission states including a motor adapted for shifting the transmission state, the electronic control apparatus comprising:
   an operator input means for generating a desired transmission state signal corresponding to manual operator input;
   a transmission state sensing means for generating a present transmission state signal indicative of the state of the automatic transmission; and
   a logic control unit connected to the motor, said operator input means and said transmission state sensing means, said logic control unit including
      means for determining if said desired transmission state signal differs from said present transmission state signal,
      means for controlling the motor to shift the transmission to said desired transmission state when said desired transmission state signal differs from said present transmission state signal, means for detecting any faults in controlling the motor to shift the transmission to said desired transmission state, means for storing a fault code corresponding to any detected faults, and means for generating an operator-perceivable output indicating any stored fault codes in response to a particular input at said operator input means.

2. The electronic control apparatus as claimed in claim 1, wherein:

said operator input means consists of a set of push-buttons, one push-button for each possible transmission state, depression of one of said push-buttons generating a desired transmission state signal corresponding to said depressed push-button;

said electronic control apparatus further including a plurality of indicator lamps equal in number to the number of said push-buttons, each indicator lamp disposed in proximity to a corresponding push-button; and said logic control unit being further connected to said plurality of indicator lamps and further including means for illuminating said indicator lamps corresponding to said present transmission state signal, and means for illuminating a plurality of said indicator lamps for generating said operator-perceivable output indicating any stored fault codes upon detection of said particular input at said operator input means, and wherein said particular input at said operator input means consists of simultaneous depression of a predetermined plurality of said push-buttons.

3. The electronic control apparatus as claimed in claim 1, wherein:

said means for detecting faults in controlling the motor to shift the transmission to said desired transmission state of said logic control unit includes means for detecting when said present transmission state signal is invalid.

4. The electronic control apparatus as claimed in claim 1, wherein:

said means for detecting faults in controlling the motor to shift the transmission to said desired transmission state of said logic control unit includes means for detecting when said desired transmission state signal differs from said present transmission state signal for more than a predetermined interval of time.

5. The electronic control apparatus as claimed in claim 4, wherein:

said means storing said fault code of any detected faults includes means for storing a time out fault code upon detection that more than said predetermined interval of time has elapsed since the determination of a difference between said desired transmission state signal and said present transmission state signal, said time out fault code including an indication of said desired transmission state signal.

6. The electronic control apparatus as claimed in claim 1, further comprising:

a motor current detecting means for generating a motor current signal indicative of the current through the motor;

said logic control unit being further connected to said motor current detecting means, and said means for detecting faults in controlling the motor to shift the transmission to said desired transmission state of said logic control unit includes means for detecting when said motor current signal indicates a motor current more than a predetermined amount.

7. The electronic control apparatus as claimed in claim 6, wherein:

said means for storing said fault code of any detected faults includes means for storing a motor overcurrent fault code upon detection that said motor current signal indicates a motor current more than a predetermined amount, said motor overcurrent fault code including an indication of said present transmission state signal upon detection of said motor overcurrent fault.

8. The electronic control apparatus as claimed in claim 1, wherein:

said logic circuit further includes means for aborting controlling the motor to shift the transmission to said desired transmission state upon detection of a fault.

9. The electronic control apparatus as claimed in claim 1, further comprising:

a nonvolatile fault code memory connected to said logic control unit; and wherein said means for storing a fault code corresponding to any detected faults of said logic control unit stores said fault codes in said nonvolatile fault code memory.

10. The electronic control apparatus as claimed in claim 9, wherein:

said logic control unit further includes means for clearing said nonvolatile fault code memory after generating said operator perceivable output indicating any stored fault codes.

11. An electronic control apparatus for control of an automatic transmission apparatus in a motor vehicle having a plurality of transmission states including a motor adapted for shifting the transmission state, the electronic control apparatus comprising:

an operator input means for generating a desired transmission state signal corresponding to manual operator input;

a transmission state sensing means for generating a present transmission state signal indicative of the state of the automatic transmission;

a plurality of vehicle state sensing means for generating respective vehicle state signals indicative of the operation state of the motor vehicle;

an input/output port for transmitting commands to said electronic control apparatus and receiving data from said electronic control apparatus; and a logic control unit connected to the motor, said operator input means, said transmission state sensing means and said input/output port, said logic control unit including means for determining if said desired transmission state signal differs from said present transmission state signal, means for controlling the motor to shift the transmission to said desired transmission state when said desired transmission state signal differs from said present transmission state signal, if said plurality of vehicle state signals indicate a permitted transmission state change, and means for transmitting data to said input/output port indicative of said respective vehicle state signals in response to a corresponding read input command at said input/output port.

12. The electronic control apparatus as claimed in claim 11, wherein:
said logic control unit further includes
means for detecting any faults in controlling the motor to shift the transmission to said desired transmission state,
means for storing a fault code corresponding to any detected faults, and
means for transmitting data corresponding to any stored fault codes to said input/output port in response to a read input command at said input/output port.

13. The electronic control apparatus as claimed in claim 12, wherein:
said operator input means consists of a set of push-buttons, one push-button for each possible transmission state, depression of one of said push-buttons generating a corresponding desired transmission state signal;
said electronic control apparatus further including a plurality of indicator lamps equal in number to the number of said push-buttons, each indicator lamp disposed in proximity to a corresponding push-button; and
said logic control unit being further connected to said plurality of indicator lamps and further including
means for illuminating said indicator lamps corresponding to said present transmission state signal,
means for illuminating a plurality of said indicator lamps for generating an operator perceivable output indicating any stored fault codes upon detection of the simultaneous depression of a predetermined plurality of said push-buttons.

14. The electronic control apparatus as claimed in claim 12, wherein:
said means for detecting faults in controlling the motor to shift the transmission to said desired transmission state of said logic control unit includes means for detecting when said present transmission state signal is invalid.

15. The electronic control apparatus as claimed in claim 12, wherein:
said means for detecting faults in controlling the motor to shift the transmission to said desired transmission state of said logic control unit includes means for detecting when said desired transmission state signal differs from said present transmission state signal for more than a predetermined interval of time.

16. The electronic control apparatus as claimed in claim 15, wherein:
said means storing said fault code of any detected faults includes means for storing a time out fault code upon detection that more than said predetermined interval of time has elapsed since the determination of a difference between said desired transmission state signal and said present transmission state signal, said time out fault code including an indication of said desired transmission state signal.

17. The electronic control apparatus as claimed in claim 12, further comprising:
a motor current detecting means for generating a motor current signal indicative of the current through the motor;
said logic control unit being further connected to said motor current detecting means, and
said means for detecting faults in controlling the motor to shift the transmission to said desired transmission state of said logic control unit includes detecting when said motor current signal indicates a motor current more than a predetermined amount.

18. The electronic control apparatus as claimed in claim 17, wherein:
said means for storing said fault code of any detected faults includes means for storing a motor overcurrent fault code upon detection that said motor current signal indicates a motor current more than a predetermined amount, said motor overcurrent fault code including an indication of said present transmission state signal upon detection of said motor overcurrent fault.

19. The electronic control apparatus as claimed in claim 12, wherein:
said logic circuit further includes
means for aborting controlling the motor to shift the transmission to said desired transmission state upon detection of a fault.

20. The electronic control apparatus as claimed in claim 12, further comprising:
a nonvolatile fault code memory connected to said logic control unit; and
wherein said means for storing a fault code corresponding to any detected faults of said logic control unit stores said fault codes in said nonvolatile fault code memory.

21. The electronic control apparatus as claimed in claim 20, wherein:
said logic control unit further includes
means for clearing said nonvolatile fault code memory after generating an operator perceivable output indicating any stored fault codes.

22. The electronic control apparatus as claimed in claim 11, wherein:
said logic control unit further includes
means for controlling the motor to shift the transmission to a particular transmission state in response to a corresponding output command at said input/output port.

23. An electronic control apparatus for control of an automatic transmission apparatus in a motor vehicle having a plurality of transmission states including a motor adapted for shifting the transmission state, the electronic control apparatus comprising:
an operator input means for generating a desired transmission state signal corresponding to manual operator input;
a transmission state sensing means for generating a present transmission state signal indicative of the state of the automatic transmission;
an input/output port for transmitting commands to said electronic control apparatus; and
a logic control unit connected to the motor, said operator input means, and said input/output port, said logic control unit including
means for determining if said desired transmission state signal differs from said present transmission state signal,
means for controlling the motor to shift the transmission to said desired transmission state when said desired transmission state signal differs from said present transmission state signal, and
means for controlling the motor to shift the transmission to a particular transmission state in response to a corresponding output command at said input/output port.

* * * * *